(12) United States Patent
Boutilier

(10) Patent No.: US 7,487,124 B2
(45) Date of Patent: Feb. 3, 2009

(54) METHOD AND APPARATUS FOR SOLVING CONCISELY EXPRESSED COMBINATORIAL AUCTION PROBLEMS

(75) Inventor: Craig E. Boutilier, Toronto (CA)

(73) Assignee: CombineNet, Inc., Pittsburgh, PA (US)

( * ) Notice: Subject to any disclaimer, the term of this patent is extended or adjusted under 35 U.S.C. 154(b) by 1256 days.

(21) Appl. No.: 10/618,238

(22) Filed: Jul. 11, 2003

(65) Prior Publication Data

US 2004/0010461 A1 Jan. 15, 2004

Related U.S. Application Data

(63) Continuation-in-part of application No. 10/211,771, filed on Aug. 2, 2002.

(60) Provisional application No. 60/395,157, filed on Jul. 11, 2002.

(51) Int. Cl.
*G06Q 40/00* (2006.01)

(52) U.S. Cl. ........................................................ 705/37

(58) Field of Classification Search ....................... None
See application file for complete search history.

(56) References Cited

U.S. PATENT DOCUMENTS

| | | | | |
|---|---|---|---|---|
| 6,035,287 | A * | 3/2000 | Stallaert et al. | 705/37 |
| 6,272,473 | B1 * | 8/2001 | Sandholm | 705/37 |
| 6,321,207 | B1 * | 11/2001 | Ye | 705/8 |
| 6,704,716 | B1 | 3/2004 | Force | |
| 6,718,312 | B1 * | 4/2004 | McAfee et al. | 705/37 |
| 2003/0225677 | A1 * | 12/2003 | Sandholm et al. | 705/37 |

FOREIGN PATENT DOCUMENTS

JP 410224301 * 8/1998

OTHER PUBLICATIONS

Nisan, Noam: "Bidding and allocation in Combinatorial Auctions", ACM conference on Electronic Commerce, Apr. 17, 2000, pp. 25.*
Arne Andersson, Mattias Tenhunen and Fredrik Ygge, "Integer Programming For Combinatorial Auction Winner Determination", 8 pp., (2000).
Yuzo Fujishima, Kevin Leyton-Brown and Yoav Shoham, "Taming the Computational Complexity of Combinatorial Auctions: Optimal And Approximate Approaches", 6 pp., (1999).

(Continued)

*Primary Examiner*—Hani M. Kazimi
*Assistant Examiner*—Olabode Akintola
(74) *Attorney, Agent, or Firm*—The Webb Law Firm

(57) ABSTRACT

A method for enabling optimizing software to determine an optimal allocation in a combinatorial auction includes (a) receiving a plurality of bids each of which includes a plurality of sub bids, wherein each sub bid is comprised of one of (1) one good and an associated price and (2) a logical operator logically connecting at least two child sub bids and a price associated with the logical operator; (b) defining an objective for the plurality of bids; (c) defining for each bid a plurality of mathematical relationships without logical operators that collectively represent the bid; and (d) causing the optimizing software to process the received bids to achieve the objective subject to the mathematical relationships. The method can be embodied in instructions stored on a computer-readable medium. When executed by a processor, the instructions can cause the processor to perform the method.

18 Claims, 13 Drawing Sheets

OTHER PUBLICATIONS

Holger H. Hoos and Craig Boutilier, "Solving Combinatorial Auctions Using Stochastic Local Search", American Association for Artificial Intelligence, 8 pp., (2000).

Kevin Leyton-Brown, Mark Pearson and Yoav Shoham, "Towards A Universal Test Suite For Combinatorial Auction Algorithms", Electronic Commerce (EC'00), 11 pp., (2000).

Noam Nisan, "Bidding And Allocation In Combinatorial Auctions", Institute of Computer Science, Hebrew U., Jerusalem, 25 pp., (Apr. 17, 2000).

S.J. Rassenti, V.L. Smith and R.L. Bulfin, "A Combinatorial Auction Mechanism For Airport Time Slot Allocation", The Bell Journal of Economics, 13(2), pp. 402-417, (1982).

Michael H. Rothkopf, Aleksander Pekec and Ronald M. Harstad, "Computationally Manageable Combinatorial Auctions", Management Science, vol. 44, No. 8, pp. 1131-1147, (Aug. 1998).

Tuomas W. Sandholm, "An Algorithm For Optimal Winner Determination In Combinatorial Auctions", 6 pp., (1999).

Tuomas W. Sandholm, "eMediator: A New Generation Electronic Commerce Server", In *Proceedings Of The Fourth International Conference On Autonomous Agents*, pp. 341-348, (2000).

Michael P. Wellman, William E. Walsh, Peter R. Wurman and Jeffrey K. Mackie-Mason, "Auction Protocols For Decentralized Scheduling", Games and Economic Behavior, 35, pp. 271-303 (2001).

Tuomas Sandholm, Subhash Suri, Andrew Gilpin and David Levine, "CABOB: A Fast Optimal Algorithm For Combinatorial Auctions", 7 pp., (2001).

Craig Boutilier and Holger H. Hoos, "Bidding Languages For Combinatorial Auctions", 7 pp., (2001).

Noa E. Kfir-Dahav, Dov Monderer and Moshe Tennenholtz, "Mechanism Design For Resource Bounded Agents", Faculty of Industrial Engineering And Management Technion-Israel Institute of Technology, Haifa 32000, Israel, 15 pp., (Jan. 19, 1999).

Noam Nisan and Amir Ronen, "Computationally Feasible VCG Mechanisms", 29 pp., (2000).

Dale Schuurmans, Finnegan Southey and Robert C. Holte, "The Exponentiated Subgradient Algorithm For Heuristic Boolean Programming", 6 pp., (2001).

* cited by examiner

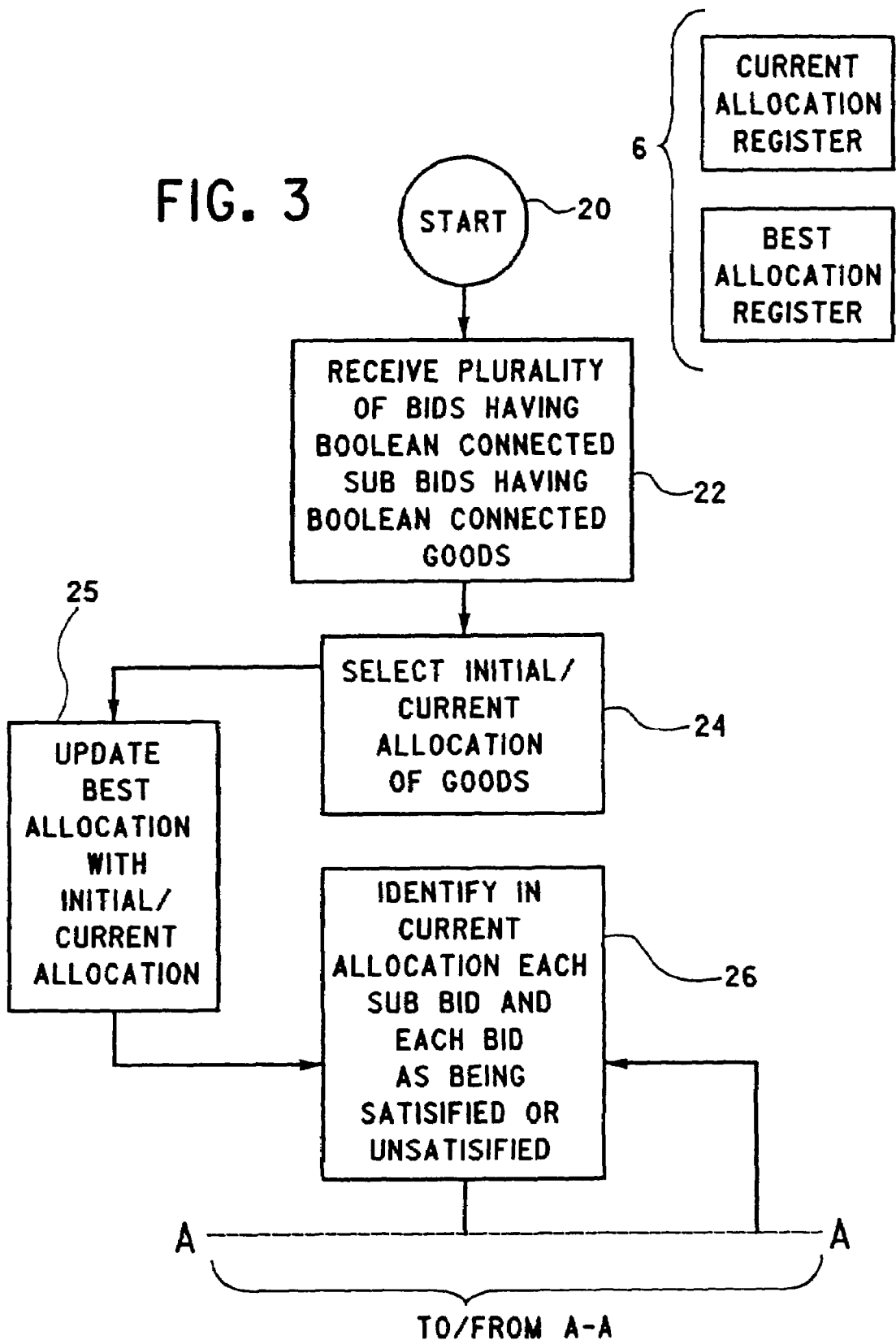

* REALLOCATE AT LEAST ONE GOOD FROM AT LEAST ONE OF THE SUB BIDS OF AT LEAST ONE BID TO ONE OF THE SUB BIDS OF ANOTHER BID.

$$\text{BID 1} = \left[\underbrace{\underbrace{\left(\underbrace{(g_1 : P_{1D} \wedge g_2 : P_{1E})}_{42} P_{1B}\right)}_{62} \vee (g_3 : P_{1F} \wedge g_4 : P_{1G}) P_{1C}}_{64}\right)_{52} \vee \underbrace{(g_5 : P_{1H}}_{72} \vee (g_6 : P_{1I}) P_{1A}\right]_{58}^{P_{1A}}$$

$$\text{BID 2} = \left[\left((g_1 : P_{2D} \wedge g_2 : P_{2E}) P_{2B}\right) \vee \left((g_3 : P_{2F} \wedge g_4 : P_{2G}) P_{2C}\right) \wedge (g_5 : P_{2H} \vee (g_6 : P_{2I})\right]^{P_{2A}}$$

$$\text{BID 3} = \left[\left((g_1 : P_{3D} \vee g_2 : P_{3E}) P_{3B}\right) \oplus \left((g_3 : P_{3F} \wedge g_4 : P_{3G}) P_{3C}\right) \oplus (g_5 : P_{3H}) \oplus (g_6 : P_{3I})\right]^{P_{3A}}$$

$$\text{BID 4} = \left[\left(\left((g_1 : P_{4F} \wedge g_2 : P_{4G}) P_{4D}\right) \vee \left((g_3 : P_{4I} \vee g_4 : P_{4J}) P_{4E}\right) \wedge \left((g_5 : P_{4K}) P_{4E} \right) P_{4B}\right) \oplus (g_6 : P_{4C})\right]^{P_{4A}}$$

WHERE $\wedge$ = AND, $\vee$ = OR and $\oplus$ = XOR;
$g$ = GOOD; and
$P$ = PRICE or VALUE.

FIG. 4

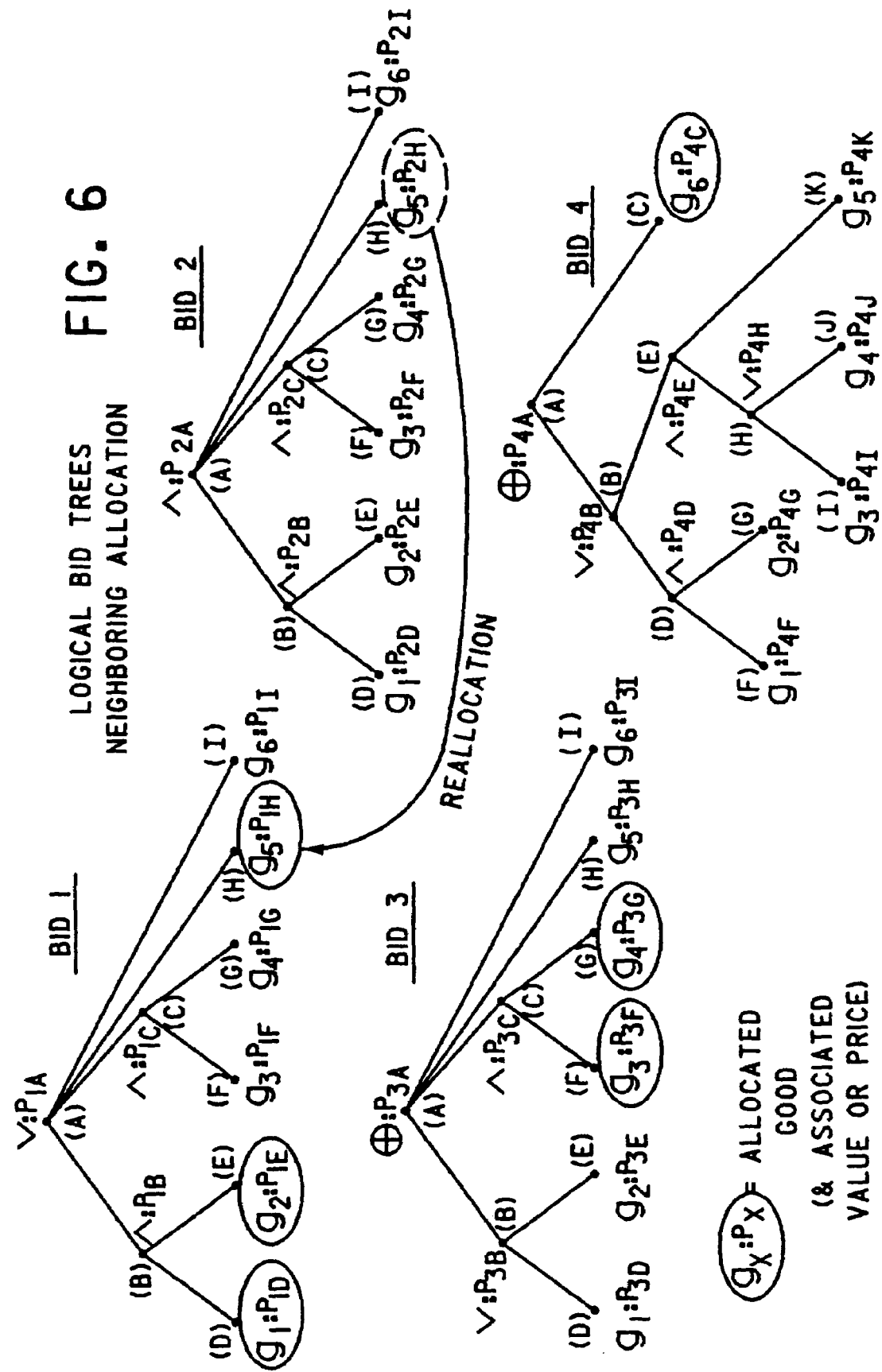

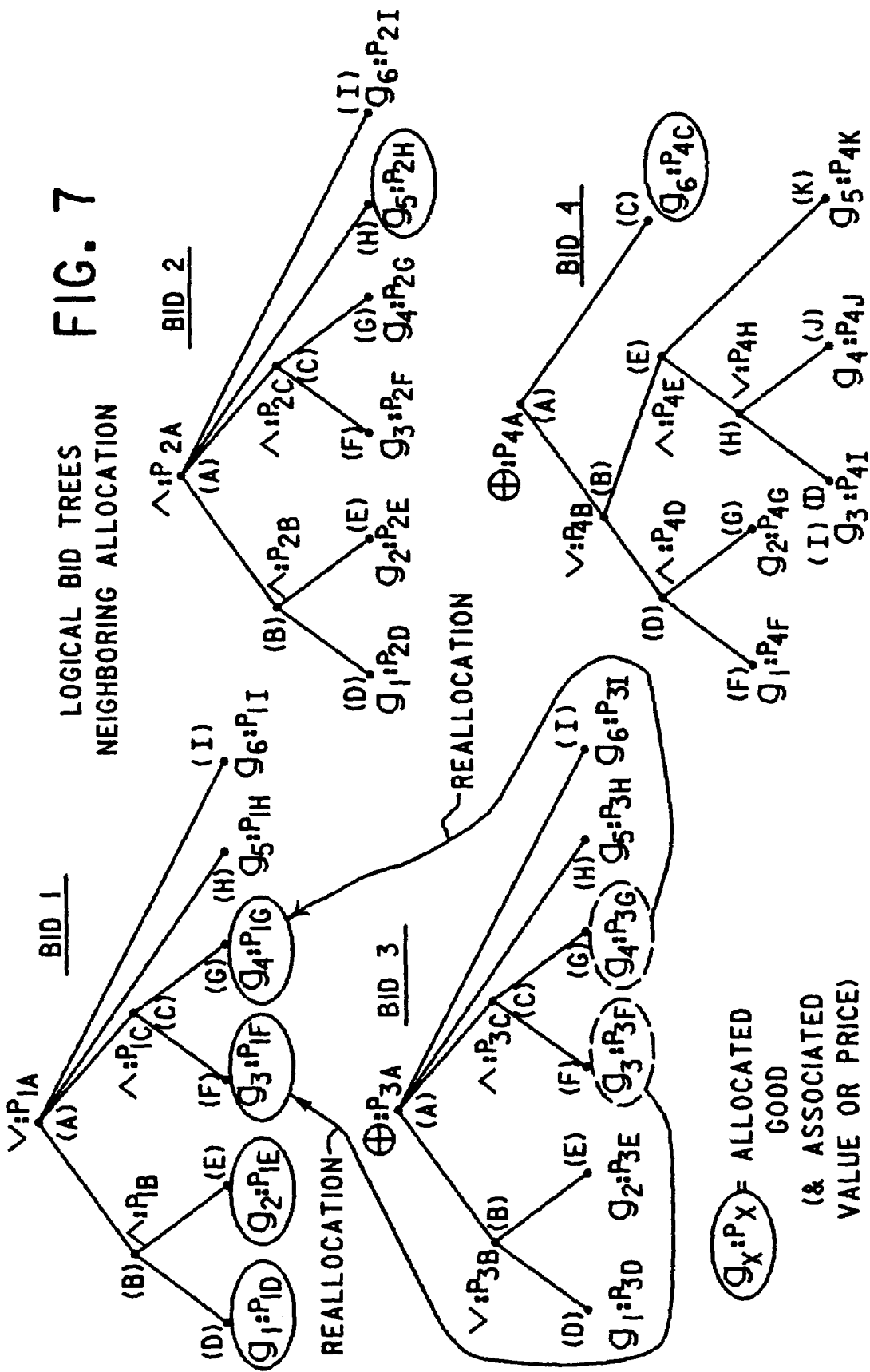

$$\text{BID 1} := \underbrace{\left\{ \underbrace{\left( \underbrace{(g_1 : P_{1D} \wedge g_2 : P_{1E})}_{62} P_{1B} \right)}_{64} \vee \underbrace{\left( \underbrace{(g_3 : P_{1F} \wedge g_4 : P_{1G})}_{66} P_{1C} \right)}_{68} \vee \underbrace{(g_5 : P_{1H})}_{72} \vee \underbrace{(g_6 : P_{1I})}_{74} \right\}}_{76} P_{1A}$$

Fig 8

Variables for Bid 1:

$X_{11}, X_{12}, X_{13}, X_{14}, X_{15}$ and $X_{16}$ ; where each $x$ is Boolean, i.e., true(1) if good is allocated, otherwise false ($\emptyset$)

Bid # ⌐ Good #

$S_{60}, S_{62}, S_{64}, S_{66}, S_{68}, S_{70}, S_{72}, S_{74}$ and $S_{76}$ ; where each $s$ is Boolean, i.e., true(1) if corresponding Sub Bid is satisfied, otherwise false ($\emptyset$)

Sub Bid Ref #

$V_{60}, V_{62}, V_{64}, V_{66}, V_{68}, V_{70}, V_{72}, V_{74}$ and $V_{76}$ ; where each $V$ is the value of the corresponding Sub Bid, e.g. $V_{60}$ = value of sub bid 60 (Integer or Real)

Sub Bid Ref #

Fig 9

$$BID\ 3 = \underbrace{\left[\underbrace{\left[\underbrace{(g_1, P_{3D} \vee g_2, P_{3E})P_{3B}}_{80}\right]}_{84} \oplus \underbrace{\left(\underbrace{(g_3, P_{3F} \wedge g_4, P_{3G})P_{3C}}_{88}\right) \oplus (g_5, P_{3H})}_{90} \oplus \underbrace{(g_6, P_{3I})}_{94}\right]}_{96} P_{3A}$$

Variables for Bid 3:

— $X_{31}, X_{32}, X_{33}, X_{34}, X_{35}$ and $X_{36}$; where each $x$ is Boolean, i.e., True (1) if good is allocated, otherwise false ($\phi$).
  $\underbrace{\phantom{XXXX}}_{\text{Point Good }\#}$ — $S_{80}, S_{82}, S_{84}, S_{86}, S_{88}, S_{90}, S_{92}, S_{94}$ and $S_{96}$; where each $s$ is Boolean, i.e., True (1) if corresponding Sub Bid is satisfied, otherwise false ($\phi$)
  $\underbrace{\phantom{XX}}_{\text{Sub Bid Ref }\#}$ — $V_{80}, V_{82}, V_{84}, V_{86}, V_{88}, V_{90}, V_{92}, V_{94}$ and $V_{96}$; where each $v$ is the value of the corresponding Sub Bid e.g., $V_{80}$ = value of sub Bid 80 (Real or Integer)
  $\underbrace{\phantom{XX}}_{\text{Sub Bid Ref }\#}$ — $t_{84}, t_{90}, t_{92}$ and $t_{94}$; where each $t$ is Boolean, i.e., True (1), if immediate Sub Bid of Reference Sub Bid contributes value thereto, otherwise false ($\phi$), e.g., $t_{84}$ is True (1) if good 1 or $g_2$ is allocated to sub Bid 80 or 82, respectively.
  $\underbrace{\phantom{XX}}_{\text{Sub Bid Ref }\#}$

Fig 10

$$Bid\ S = \overbrace{[k\text{-}of((g_1 : P_{SB}), \underbrace{(g_2 : P_{SC})}_{100}, \underbrace{(g_3 : P_{SD})}_{102})\ P_{SA}]}^{108}$$

where $k$ is a real value $\leq 2$

Variables for Bid S:

— $X_{S1}$, $X_{S2}$ and $X_{S3}$ ; where each $X$ is Boolean true if good is allocated, otherwise Boolean false.
  (Bid # , Good #)

— $S_{100}$, $S_{102}$, $S_{104}$ and $S_{106}$ ; where each $x$ is Boolean true if corresponding sub Bid satisfied, otherwise Boolean false.
  (sub Bid Ref #)

— $V_{100}$, $V_{102}$, $V_{104}$ and $V_{106}$ ; where each $V$ is the value of the corresponding sub Bid.
  (sub Bid Ref #)

— $n_{106}$ ; an interger or real value related to the number of satisfied sub bids of Bid S

FIG. 11(a)

(Atomic):

| | Equation 1 | Equation 2 |
|---|---|---|
| Bid 1: | $S_{60} \leq X_{11}$ | $V_{60} \leq P_{1D} * S_{60}$ |
| | $S_{62} \leq X_{12}$ | $V_{62} \leq P_{1E} * S_{62}$ |
| | $S_{66} \leq X_{13}$ | $V_{66} \leq P_{1F} * S_{66}$ |
| | $S_{68} \leq X_{14}$ | $V_{68} \leq P_{1G} * S_{68}$ |
| | $S_{72} \leq X_{15}$ | $V_{72} \leq P_{1H} * S_{72}$ |
| | $S_{74} \leq X_{16}$ | $V_{74} \leq P_{1I} * S_{74}$ |
| Bid 3: | $S_{80} \leq X_{31}$ | $V_{80} \leq P_{3D} * S_{80}$ |
| | $S_{82} \leq X_{32}$ | $V_{82} \leq P_{3E} * S_{82}$ |
| | $S_{86} \leq X_{33}$ | $V_{86} \leq P_{3F} * S_{86}$ |
| | $S_{88} \leq X_{34}$ | $V_{88} \leq P_{3G} * S_{88}$ |
| | $S_{92} \leq X_{35}$ | $V_{92} \leq P_{3H} * S_{92}$ |
| | $S_{94} \leq X_{36}$ | $V_{94} \leq P_{3I} * S_{94}$ |
| Bid 5: | $S_{100} \leq X_{51}$ | $V_{100} \leq P_{5B} * S_{100}$ |
| | $S_{102} \leq X_{52}$ | $V_{102} \leq P_{5C} * S_{102}$ |
| | $S_{104} \leq X_{53}$ | $V_{104} \leq P_{5D} * S_{104}$ |

FIG. 11(b)

(AND):

| | Equation 3 | Equation 4 |
|---|---|---|
| Bid 1: | $2 * S_{64} \leq S_{60}+S_{62}$ | $V_{64} \leq P_{1B} * S_{64}+V_{60}+V_{62}$ |
| | $2 * S_{70} \leq S_{66}+S_{68}$ | $V_{64} \leq P_{1C} * S_{70}+V_{66}+V_{68}$ |
| Bid 3: | $2 * S_{90} \leq S_{86}+S_{88}$ | $V_{90} \leq P_{3C} * S_{90}+V_{86}+V_{88}$ |

FIG. 11(c)

(OR and XOR):

|  | Equation 5 | Equation 6 |
|---|---|---|
| Bid 1: | $s_{76} \le s_{64}+s_{70}+s_{72}+s_{74}$ | $v_{76} \le p_{1A}*s_{76}+v_{64}+v_{70}+v_{72}+v_{74}$ |
| Bid 3: | $s_{84} \le s_{80}+s_{82}$ | $v_{84} \le p_{3B}*s_{84}+v_{80}+v_{82}$ |
|  | $s_{96} \le s_{84}+s_{90}+s_{92}+s_{94}$ | $v_{96} \le p_{3A}*s_{96}+v_{84}+v_{90}+v_{92}+v_{94}$ |

FIG. 11(d)

(XOR only):

|  | Equation 7 | Equation 8 |
|---|---|---|
| Bid 3: | $t_{84}+t_{90}+t_{92}+t_{94} \le 1$ | $v_{84} \le \text{MAXVAL} * t_{84}$ |
|  |  | $v_{90} \le \text{MAXVAL} * t_{90}$ |
|  |  | $v_{92} \le \text{MAXVAL} * t_{92}$ |
|  |  | $v_{94} \le \text{MAXVAL} * t_{94}$ |

FIG. 11(e)

(k-of) where k = 2:

Bid 5:

Equation 9:
$n_{106} \le s_{100}+s_{102}+s_{104}$

Equation 10:
$s_{106}*2 \le n_{106}$

Equation 11:
$v_{106} \le p_{5A}*s_{106}+v_{100}+v_{102}+v_{104}$

METHOD AND APPARATUS FOR SOLVING CONCISELY EXPRESSED COMBINATORIAL AUCTION PROBLEMS

CROSS REFERENCE TO RELATED APPLICATION

The present invention is a Continuation-In-Part of earlier filed, pending U.S. patent application Ser. No. 10/211,771, filed Aug. 2, 2002 and claims the benefit of United States Provisional Patent Application No. 60/395,157, filed Jul. 11, 2002.

BACKGROUND OF THE INVENTION

1. Field of the Invention

The present invention relates to a method of winner determination in combinatorial auctions.

2. Description of the Prior Art

Combinatorial auctions have emerged as a useful tool for determining resource allocations. Unfortunately, winner determination for combinatorial auctions is NP-hard and current methods have difficulty with combinatorial auctions involving goods and bids beyond the hundreds.

Combinatorial auctions are a form of auction in which a seller with multiple items for sale accepts bids on bundles, or combinations of items. When items exhibit complimentarities for potential buyers, that is, when certain items are less valuable unless complementary items are obtained, allowing combinatorial bids generally reduces a bidder's risk and allows for a more efficient allocation of goods and greater seller revenue than had the items been auctioned individually, either sequentially or simultaneously. Given a set of combinatorial bids on a collection of items, the winner determination problem is that of allocating items to bidders, i.e., determining the winning bids/bundles, so as to maximize the seller's revenue. Applications of combinatorial auctions range from commodities trading, to resource allocation, to scheduling, to logistics planning, and the selling of any goods that exhibit complementarities, e.g., broadcast spectrum rights, airport gate allocations, and the like.

A combinatorial auction process will now be generally described with reference to FIG. 1. Assume a seller or auctioneer has a set G of M goods for sale and various potential buyers are interested in certain collections, or bundles, of these goods. Because of complementarities, the seller allows buyers to offer bundle bids. Namely, a buyer can offer to purchase a bundle of goods without committing to purchase anything but the complete bundle. A buyer can also bid on many distinct bundles involving overlapping bundles. Each bid B can comprise the entire set G or a subset of set G of the M goods and a corresponding monetary bid V. In a combinatorial auction, the seller can receive a collection of these bids from any number of potential buyers.

The problem of winner determination in a combinatorial auction is to find a subset of received bids where the sum of the monetary bid values of the non-overlapping bids is maximal, thus maximizing the seller's revenue. Stated differently, the winner determination problem is to find an allocation where each bid is disjoint, and the sum of the monetary bids of the allocation is maximal.

Most combinatorial auctions have one or more bids expressed using a simple bundle of goods associated with the price for that bundle. Such a bid captures the complementarities among the goods within the bundle. However, a buyer with a complex bidding requirement will often need to submit multiple bids in order to accurately reflect this requirement.

It would, therefore, be desirable to provide a method and apparatus for finding a high quality, even optimal, allocation in a combinatorial auction where one or more bids of the auction are in a form that concisely express a logical combination of goods whereupon the need to submit multiple bids in order to accurately reflect the buyer's requirement is avoided. Still other objects of the present invention will become apparent to those of ordinary skill in the art upon reading and understanding the following detailed description.

SUMMARY OF THE INVENTION

The invention is a method for enabling optimizing software to determine an optimal allocation in a combinatorial auction. The method includes (a) receiving a plurality of bids each of which includes a plurality of sub bids, wherein each sub bid is comprised of one of (1) one good and an associated price and (2) a logical operator logically connecting at least two child sub bids and a price associated with the logical operator; (b) defining an objective for the plurality of bids; (c) defining for each bid a plurality of mathematical relationships without logical operators that collectively represent the bid; and (d) causing the optimizing software to process the received bids to achieve the objective subject to the mathematical relationships.

Step (c) can include, for each sub bid comprised of one good and an associated price, defining a first mathematical relationship between a pair of Boolean variables that relate (1) the one good being allocated to the bid that includes the sub bid to (2) satisfaction of the sub bid, wherein the sub bid is satisfied when the one good is allocated thereto and defining a second mathematical relationship that relates (1) a value of the sub bid to (2) a product of the price of the sub bid times a value of a Boolean variable related to the satisfaction of the sub bid.

The first mathematical relationship can include setting (1) the Boolean variable related to satisfaction of the sub bid less than or equal to ($\leqq$) (2) the Boolean variable related to the bid including the sub bid being allocated the one good. The second mathematical relationship can include setting (1) the value of the sub bid $\leqq$(2) the product of the price of the sub bid times the value of a Boolean variable related to the satisfaction of the sub bid.

Step (c) can also or alternatively include, for each sub bid comprised of a logical operator AND logically connecting at least two child sub bids, defining a third mathematical relationship that relates (1) a sum of Boolean values related to satisfaction of each child sub bid to (2) a product of the total number of the child sub bids logically connected by the logical operator AND times a Boolean value related to the satisfaction of the sub bid comprised of the logical operator AND, wherein the sub bid comprised of the logical operator AND is satisfied when all of the child sub bids logically connected thereby are satisfied and defining a fourth mathematical relationship that relates (1) a value of the sub bid comprised of the logical operator AND to (2) a sum of the values of each child sub bid that is satisfied and the price associated with the sub bid comprised of the logical operator AND, wherein said price is included in the sum when said sub bid is satisfied, otherwise it is not included in the sum.

The third mathematical relationship can includes setting (1) the product of the total number of the child sub bids logically connected by the logical operator AND times a Boolean value related to the satisfaction of the sub bid comprised of the logical operator AND $\leqq$(2) the sum of the Boolean values related to satisfaction of each of the at least two child sub bids. The fourth mathematical relationship can include setting (1) the value of the sub bid comprised of the logical operator AND ≦(2) the sum of (i) the values of the at least two child sub bids and (ii) the price associated with the sub bid comprised of the logical operator AND times the Boolean value related to satisfaction of said sub bid.

Step (c) can also or alternatively include, for each sub bid comprised of a logical operator OR or XOR logically connecting at least two child sub bids, defining a fifth mathematical relationship that relates (1) a sum of Boolean values related to satisfaction of each child sub bid to (2) satisfaction of the sub bid comprised of the logical operator OR or XOR, wherein the sub bid comprised of the logical operator OR or XOR is satisfied when at least one of the child sub bids logically connected thereby is satisfied and defining a sixth mathematical relationship that relates (1) a value of the sub bid comprised of the logical operator OR or XOR to (2) a sum of the values of each child sub bid that is satisfied and the price associated with the sub bid comprised of the logical operator OR or XOR, wherein said price is included in the sum when said sub bid is satisfied, otherwise it is not included in the sum.

The fifth mathematical relationship can include setting (1) the satisfaction of the sub bid comprised of the logical operator OR or XOR ≦(2) the sum of Boolean values related to satisfaction of each of the at least two child sub bids. The sixth mathematical relationship can include setting (1) the value of the sub bid comprised of the logical operator OR or XOR ≦ (2) the sum of the values of the at least two child sub bids and the price associated with the sub bid comprised of the logical operator OR or XOR times the Boolean value related to satisfaction of said sub bid.

Step (c) can also or alternatively include, for each sub bid comprised of a logical operator XOR logically connecting the at least two child sub bids, defining a seventh mathematical relationship that relates (1) an integer value to (2) a sum of Boolean values related to each child sub bid, wherein each child sub bid that contributes value to the sub bid comprised of the logical operator XOR is assigned a first Boolean value, otherwise it is assigned a second Boolean value. The seventh mathematical relationship can include setting (1) the sum of the Boolean values related to the at least two child sub bids ≦ (2) the integer value.

Step (c) can also or alternatively include, defining an eighth mathematical relationship for each child sub bid that contributes value to the sub bid comprised of the logical operator XOR, wherein said relationship relates (1) a value of the child sub bid to (2) a product of the Boolean value of said child sub bid times a predetermined value. The eighth mathematical relationship can include setting (1) the value of the child sub bid ≦(2) the product of the Boolean value of said sub bid times the predetermined value. Desirably the predetermined value can be greater than or equal to the largest value of any of the child sub bids that contributes value to the sub bid comprised of the logical operator XOR. More desirably, the predetermined value is the sum of all the prices included in the bid including the child sub bids.

Step (c) can also or alternatively include, for each sub bid for k number of child sub bids, where k is less than a total number of child sub bids available: defining a ninth mathematical relationship that relates (1) a total number of satisfied child sub bids bid to (2) a sum of Boolean values related to satisfaction of each child sub bid; defining a tenth mathematical relationship that relates (1) a total number of satisfied child sub bids to (2) a product of k times a Boolean value related to satisfaction of the sub bid; and defining an eleventh mathematical relationship that relates (1) a value of the sub bid to (2) a sum of the values of each child sub bid that is satisfied and a price associated with the sub bid, wherein said price is included in the sum when said sub bid is satisfied, otherwise it is not included in the sum.

The ninth mathematical relationship can include setting (1) the total number of satisfied child sub bids ≦(2) the sum of Boolean values related to satisfaction of each child sub bid. The tenth mathematical relationship can include setting (1) the product of k times a Boolean value related to satisfaction of the sub bid ≦(2) the total number of satisfied child sub bids. The eleventh mathematical relationship can include setting (1) the value of the sub bid ≦(2) the sum of the values of each child sub bid that is satisfied and the price associated with the sub bid times a Boolean value related to satisfaction of the sub bid.

For each sub bid comprised of one good and an associated price, said sub bid is satisfied when the one good is allocated to the bid including the sub bid. For each sub bid comprised of a logical operator AND logically connecting at least two child sub bids, said sub bid is satisfied when all of the child sub bids are satisfied. For each sub bid comprised of a logical operator OR or XOR logically connecting at least two child sub bids, said sub bid is satisfied when at least one of the child sub bids is satisfied For each sub bid for k number of child sub bids, said sub bid is satisfied when at least k number of child sub bids are satisfied.

The invention is also a method of processing a plurality of bids whereupon optimizing software can determine an optimal allocation of goods in a combinatorial auction, wherein each bid includes a plurality of sub bids and each sub bid is comprised of (1) one good and an associated price or (2) a logical operator connecting at least two child sub bids and a price associated with said logical operator. The method includes (a) defining for each sub bid comprised of one good and an associated price, the constraints:

$$s \leq x \text{ and } v \leq s*p;$$

(b) defining for each sub bid comprised of a logical operator AND logically connecting at least d child sub bids, the constraints:

$$d*s \leq \sum_{i \leq d} s_i \text{ and } v \leq (p*s) + \sum_{i \leq d} v_i;$$

(c) defining for each sub bid comprised of a logical operator OR or a logical operator XOR logically connecting at least d child sub bids, the constraints:

$$s \leq \sum_{i \leq d} s_i \text{ and } v \leq (p*s) + \sum_{i \leq d} v_i;$$

(d) defining for each sub bid comprised of the logical operator XOR logically connecting the at least d child sub bids, the additional constraints:

$$\sum_{i \leq d} t_i \leq 1$$

and $$v_i \leq \text{maxval}*t_i, \text{ for every } i \leq d;$$

(e) defining for each sub bid for k number of child sub bids, where k is less than a total number of child sub bids available, the constraints:

$$n \le \sum_{i \le d} s_i, \; s*k \le n \text{ and } v \le (p*s) + \sum_{i \le d} v_i;$$

and (f) processing the combinatorial bids subject to the constraints defined in steps (a)-(e) to achieve a predetermined objective, where:

s=a Boolean variable related to satisfaction of the sub bid;

x=a Boolean variable related to whether the one good has been allocated to the bid including the sub bid;

v=an integer or real variable related to the value of the sub bid;

p=a price associated with the sub bid;

d=an integer value related to the number of child sub bids logically connected by the corresponding logical operator;

i=an integer value related to a particular child sub bid;

$s_i$=a Boolean variable related to satisfaction of child sub bid i;

$v_i$=a variable related to the value of child sub bid i;

$t_i$=a Boolean variable utilized to ensure that the value of only one of the XOR'ed child sub bids contributes to the value (v) for the sub bid;

maxval=a constant having a value greater than any value $v_i$;

n=an integer or real value related to the number of satisfied child sub bids; and k=the number of sub bids which, when satisfied, will satisfy the bidder's requirement.

The predetermined objective can include maximizing or minimizing a value of the plurality of bids. In step (f), the plurality of bids can be processed utilizing (1) integer program (IP) optimizing software (2) mixed integer program (MIP) optimizing software.

Lastly, the invention is a computer-readable medium having stored thereon instruction which, when executed by a processor, cause the processor to perform the steps of (a) receive a plurality of bids each of which includes a plurality of sub bids, wherein each sub bid is comprised of one of (1) one good and an associated price and (2) a logical operator logically connecting at least two child sub bids and a price associated with the logical operator; (b) define an objective for the plurality of bids; (c) define for each bid a plurality of mathematical relationships without logical operators, wherein said mathematical relationships collectively represent the bid; and (d) process the received bids subject to the mathematical relationships to achieve the objective.

BRIEF DESCRIPTION OF THE DRAWINGS

FIG. 4 is a plurality of exemplary bids in accordance with the present invention;

FIGS. 6-7 are neighboring allocations generated from the logical bid trees shown in FIG. 5;

FIG. 8 shows Bid 1 from FIG. 4 along with variables formed therefor that conventional optimizing software can utilize for determining an optimal allocation of goods;

FIG. 9 shows Bid 3 from FIG. 4 along with variables formed therefor that conventional optimizing software can utilize for determining an optimal allocation of goods;

FIG. 10 shows a "k-of" Bid 5 along with variables formed therefor that conventional optimizing software can utilize for determining an optimal allocation of goods;

FIG. 11(a) shows constraints for atomic sub bids of Bids 1, 3 and 5 formed utilizing the variables shown in FIGS. 8, 9 and 10, respectively;

FIG. 11(b) shows constraints for logical operator AND sub bids of Bids 1 and 3 formed from the variables shown in FIGS. 8 and 9, respectively, and from one or more of the constraints shown in FIG. 11(a);

FIG. 11(c) shows constraints for logical operator OR or XOR sub bids of Bids 1 and 3 utilizing the variables shown in FIGS. 8 and 9, respectively, and one or more of the constraints shown in FIGS. 11(a) and 11(b);

FIG. 11(d) shows constraints formed for logical operator XOR sub bids of Bid 3 utilizing the variables shown in FIG. 9, and one or more of the constraints shown in FIGS. 11(a) and 11(c); and FIG. 11(e) shows constraints formed for "k-of" Bid 5 utilizing the variables shown in FIG. 10, and one or more of the constraints shown in FIG. 11(a).

DETAILED DESCRIPTION OF THE INVENTION

The winner determination problem for a combinatorial auction is a difficult computational problem whose solution time grows exponentially with problem size. To solve this problem, an approximate solution algorithm for winner determination based on the use of a stochastic local search technique can be utilized. This algorithm does not systematically search through the space of possible solutions, but instead utilizes a random component to guide the search. While this algorithm can be useful, it does not guarantee that an optimal, revenue-maximizing allocation will be found. Despite the lack of guarantees, however, this algorithm typically finds high quality solutions much faster than existing algorithms.

Notwithstanding the usefulness of this algorithm, it would be desirable to utilize conventional optimizing software for winner determination. However, heretofore, no method has been disclosed for converting bids that utilize highly expressive logical operators to express the buyer's requirement in a combinatorial auction into variables and constraints that are suitable as input for conventional optimizing software. The present invention is a method, desirably computer implemented, for converting such combinatorial bids into variables and constraints that can be input into conventional optimizing software whereupon an optimal allocation of goods can be determined without the need to utilize an approximate solution algorithm to search through the space of possible solutions.

For the purpose of understanding the benefits of the present invention, the approximate solution algorithm will be described first followed by a description of the method for converting combinatorial bids into variables and constraints suitable for use by conventional optimizing software.

Figure 1:
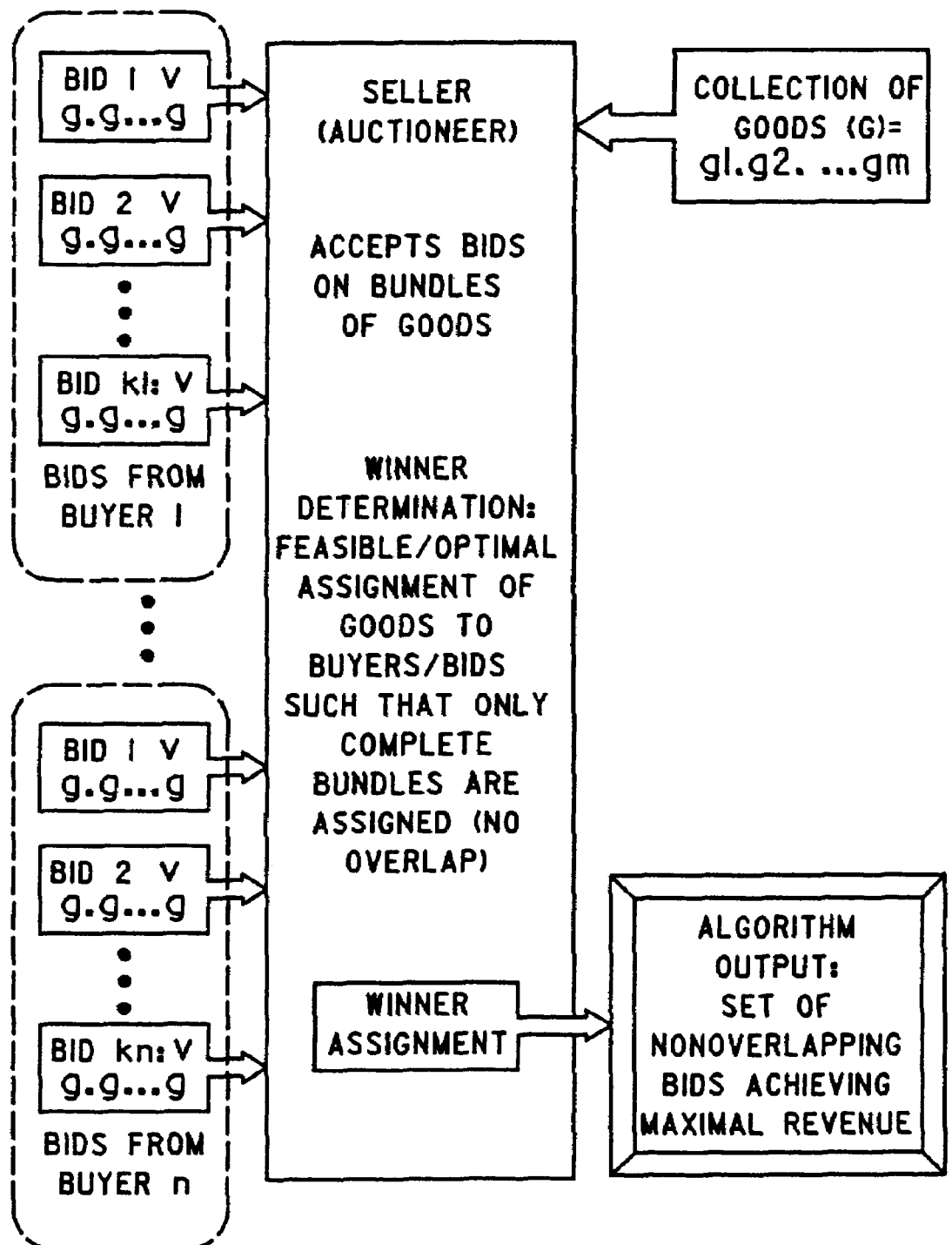
FIG. 1 is a diagrammatic illustration of a combinatorial auction process.
Figure 2:
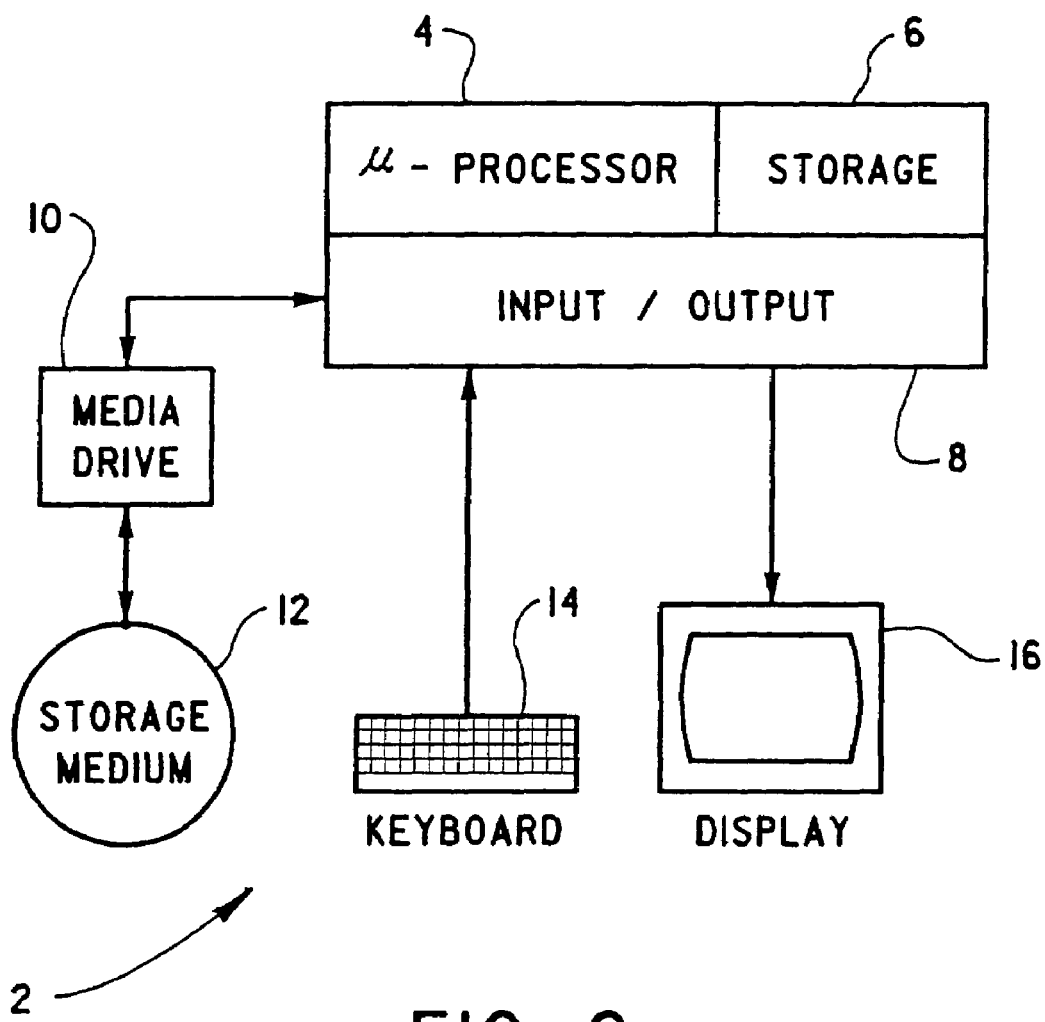
FIG. 2 is a schematic illustration of a computer system which implements computer software which embodies the present invention.

With reference to FIG. 2, the approximate solution algorithm is embodied in computer software which operates on a computer system 2 in a manner known in the art. Computer system 2 includes a microprocessor 4, a storage 6 and an input/output system 8. Computer system 2 can also include a media drive 10, such as a disk drive, CD-ROM drive, and the like. Media drive 10 can operate with a computer-usable storage medium 12 capable of storing the computer-readable program code comprising the computer software which embodies the approximate solution algorithm, which computer-readable program code is able to configure and operate computer system 2 in a known manner. Input/output system 8 can include a keyboard 14 and/or a display 16. Computer system 2 is exemplary of computer systems capable of executing the computer software which embodies the approximate solution algorithm and is not to be construed as limiting the invention.

Figure 3:
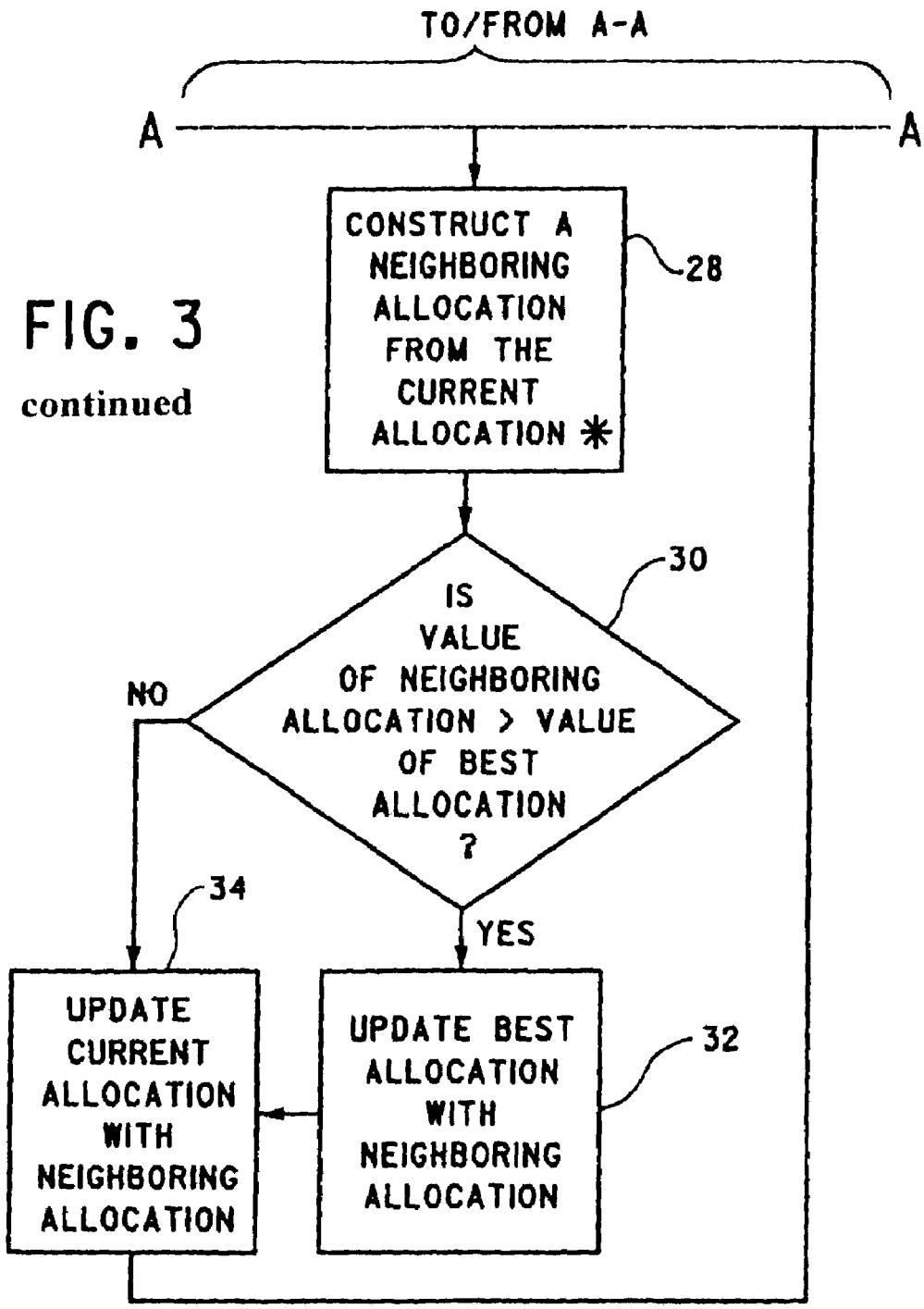
FIG. 3 is a flow diagram of a method of determining an approximately optimal allocation of goods in a combinatorial auction.

With reference to FIG. 3, the method implemented by the approximate solution algorithm begins at step 20 where various registers of storage 6 are initialized. These registers include, without limitation, registers for storing data related to a current allocation and its value, and a best allocation and its value. Next, program flow advances to step 22 where a plurality of bids is received in storage 6. FIG. 4 shows four non-limiting examples of the types of bids that can be received in step 22. As can be seen, each of Bid 1-Bid 4 has associated therewith at least one sub bid, at least one value or price and at least one logical operator. For purpose of the present invention, a sub bid is either (a) an atomic bid, i.e., a good and an associated price, e.g., sub bid 40, or (b) a logical operator or logical connective, e.g., 42, having an associated price, e.g., price $p_{1B}$ 44, and two or more sub bids, e.g., sub bids 60 and 62. An example of the latter sub bid (b) is shown in Bid 1 of FIG. 4 where logical operator 42, price $p_{1B}$ 44 and sub bids 60 and 62 collectively form sub bid 64. As will become more apparent hereinafter, logical operators 52, 54 and 56 are associated with price $p_{1A}$ 58.

Each logical operator can be one of the Boolean operators AND, OR or XOR. For simplicity of illustration, and to reduce the number of characters required to express a logical function, logical operators AND, OR and XOR can be expressed by the symbols $\wedge$, $\vee$ and $\oplus$, respectively. However, the selection and association of a character to a corresponding logical operator is not to be construed as limiting the invention since other characters or sets of characters can likewise be chosen or the logical operators AND, OR and XOR can be utilized.

Figure 5:
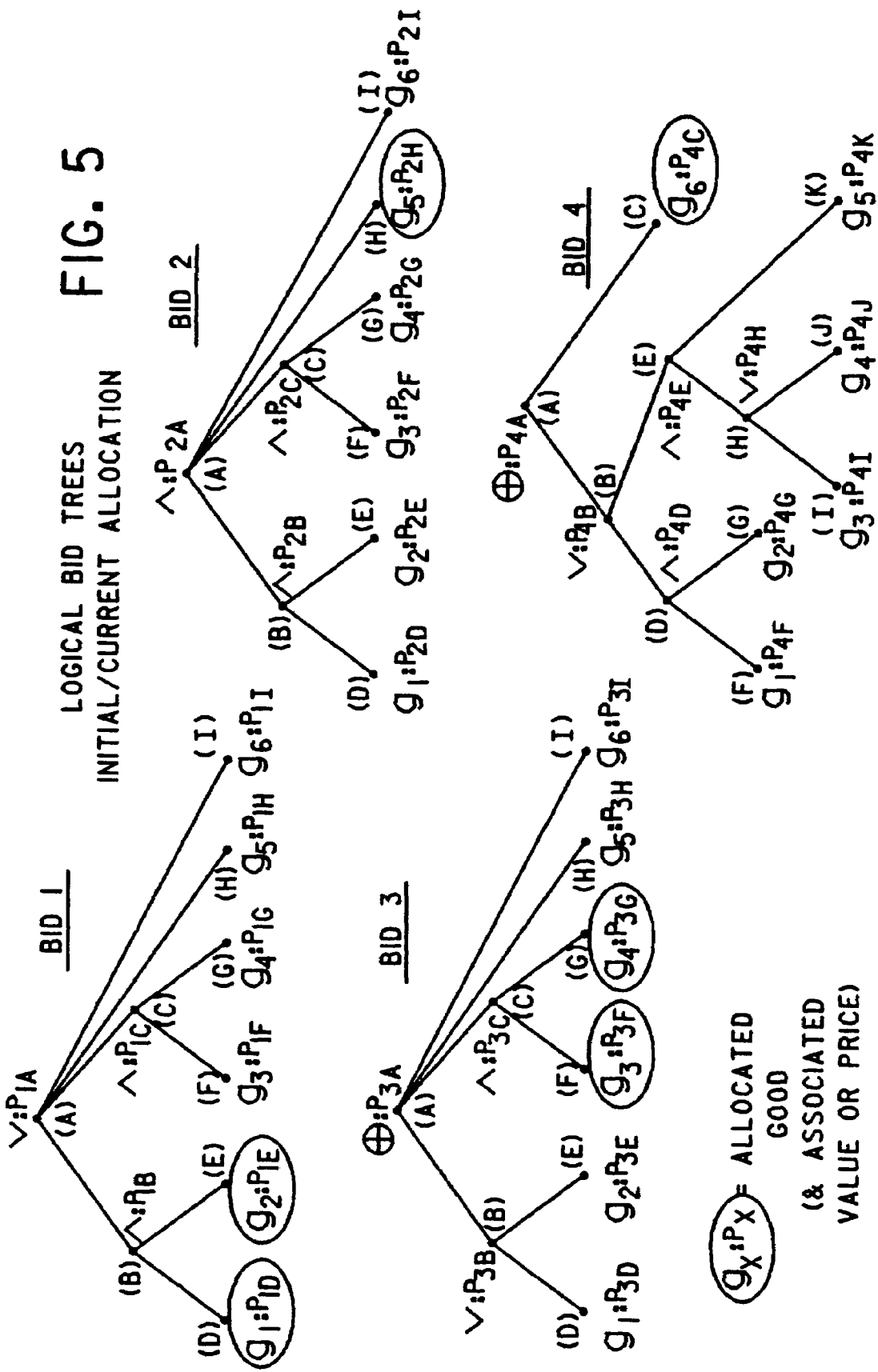
FIG. 5 are logical bid trees showing the initial allocation of goods to the bids shown FIG. 4.

With reference to FIG. 5, and with ongoing reference to FIGS. 3 and 4, once the plurality of bids, e.g., Bid 1, Bid 2, Bid 3 and Bid 4, is received in storage 6, program flow advances to step 24 where an initial allocation of goods and its value are determined and stored as the current allocation and its value in the current allocation register. Stated differently, the available goods, e.g., $g_1$ through $g_6$, are allocated to one or more of Bid 1-Bid 4. FIG. 5 shows logical bid trees for Bid 1-Bid 4 in FIG. 4 with allocated goods illustrated with a circle and with each node of each logical bid tree representing a sub bid of its respective Bid 1-Bid 4. The allocation of goods in FIG. 5 is not to be construed as limiting the present invention. However, it is to be appreciated that a bid at lower node of a bid tree may be considered to be a sub bid of a bid at a higher node of the bid tree. To this end, the bid associated with each node, A, B, C, etc., in each bid tree has a sub bid associated therewith. Accordingly, the terms "bid" and "sub bid" are used interchangeably in many instances in the following description and, therefore, these terms are not to be construed as limiting the invention.

The concept of a bid or sub bid being "satisfied" or "unsatisfied" will now be described. A bid (or sub bid) that has only a single good g is satisfied when that good g has been allocated to the bid (or sub bid). Otherwise, the bid (or sub bid) is unsatisfied. For example, suppose in FIG. 5 that good $g_5$ has been allocated to Bid 2. Because the sub bid associated with node H of Bid 2 only includes good $g_5$, this sub bid is satisfied. Similar comments apply in respect of the sub bid associated with node C of Bid 4.

When a bid (or sub bid) includes goods g connected by the logical operator AND, the bid (or sub bid) is satisfied by the allocation of all of its goods thereto. For example, the sub bids associated with nodes D and E of Bid 1 include allocated goods $g_1$ and $g_2$ connected by the logical operator AND in the bid (or sub bid) associated with node B. Because of this logical operator, the bid (or sub bid) associated with node B of Bid 1 is satisfied when goods $g_1$ and $g_2$ are both allocated to Bid 1. However, if one or both of goods $g_1$ and $g_2$ are not allocated to Bid 1, the bid associated with node B of Bid 1 would be unsatisfied When a bid (or sub bid) includes goods g connected by the logical operator OR or XOR, the bid (or sub bid) is satisfied by the allocation of one or more goods g thereto. For example, the sub bids associated with nodes F and G of Bid 3 include goods $g_3$ and $g_4$ connected by the logical operator OR in the bid (or sub bid) associated with node C. Because of this logical operator, the bid (or sub bid) associated with node C of Bid 3 is satisfied when good $g_3$, good $g_4$ or both are allocated to Bid 3. Similar comments apply in respect of goods g connected by the logical operator XOR.

Similarly, a higher level bid (or sub bid) is satisfied or unsatisfied based on whether the Boolean solution of one or more of its sub bids is true or false. For example, since the bids (or sub bids) associated with nodes B, C, H and I of Bid 1 are OR'ed together at node A thereof, Bid 1 is satisfied if any of these bids (or sub bids) are satisfied. In another example, since the bids (or sub bids) associated with nodes B, C, H and I of Bid 2 are AND'ed together at node A thereof, Bid 2 is satisfied only if all of these bids (or sub bids) are satisfied. In the allocation shown in FIG. 5, only good $g_5$ has been allocated to Bid 2. Hence, in this allocation, Bid 2 is unsatisfied. In yet another example, since the bids (or sub bids) associated with nodes B and C of Bid 4 are XOR'ed together, Bid 4 is satisfied if either of these bids (or sub bids) are satisfied. However, if the bids (or sub bids) associated with nodes B and C of Bid 4 are unsatisfied, then Bid 4 is unsatisfied. Thus, it can be seen that a higher level bid (or sub bid) having one or more satisfied lower level bids (or sub bids) may not necessarily result in the higher level bid (or sub bid) itself being satisfied.

In FIG. 3, once the initial allocation of goods and its value are determined in step 24, program flow advances to step 25 where the best allocation register is updated with the initial allocation and its value.

With reference to FIG. 6 and with continuing reference to FIGS. 2-5, next, program flow advances to step 26 where a neighboring allocation is constructed from the current allocation. This neighboring allocation is constructed by reallocating within the current allocation at least one good from at least one of the bids, i.e., a source bid, to one of the other bids, i.e., a destination bid. For example, in FIG. 6, good $g_5$ is reallocated from Bid 2 to Bid 1. Next, in step 28, the value of the neighboring allocation is determined. During determination of this value, a determination is made whether the reallocation has resulted in the source bid, or any sub bid thereof, and the destination bid, or any sub bid thereof, being satisfied or unsatisfied. In the present example, since the sub bid associated with node H of Bid 1 only includes good $g_5$, it is satisfied. In contrast, since the sub bid associated with node H of Bid 2 no longer has good $g_5$ allocated thereto, it is now unsatisfied.

Next, program flow advances to step 30 where it is determined if the value of the neighboring allocation shown in FIG. 6 is greater than the value of the best allocation shown in FIG. 5.

The value of any bid (or sub bid) is determined as follows. If a bid (or sub bid) includes a single good g with a price p (an atomic bid), the value of the bid (or sub bid) is p if the bid (or sub bid) is satisfied. Otherwise, the value of the bid (or sub bid) is zero. If a bid (or sub bid) has a price p and the bid (or sub bid) utilizes the logical operator AND to logically connect two or more sub bids, the value of the bid (or sub bid) is obtained by summing the prices of the satisfied sub bids and, if the bid is satisfied, adding the price p to the summed prices. For example, suppose that goods $g_1$ and $g_2$ are allocated to Bid 1. Since the sub bid represented by node B of Bid 1 has the logical operator AND connecting the sub bids represented by nodes D and E of Bid 1, the value of the sub bid represented by node B of Bid 1 is the sum of the prices of $p_{1D}$, $p_{1E}$ and $p_{1B}$. However, if only good $g_1$ is allocated to Bid 1, the sub bid represented by node B is unsatisfied because the Boolean solution of AND'ing goods $g_1$ and $g_2$ is false. Accordingly, the value of the sub bid represented by node B is the price $p_{1D}$ associated with good $g_1$. The rationale for this latter value is as follows. Suppose $g_1$ is a left shoe and $g_2$ is a right shoe and the price $p_{1B}$ is for the pair of shoes. However, the individual shoes, may have some salvage value when the pair of shoes is not available. For this reason, $p_{1D}$ and $p_{1E}$ are both assigned salvage prices, e.g., one dollar, even though the real interest for the pair of shoes has not been satisfied. Hence, if only the shoe associated with good $g_1$ is available, the value of the sub bid associated with node B of Bid 1 is $p_{1B}$, or one dollar in the present example.

If a bid (or sub bid) has two or more sub bids connected by the logical operator OR and the bid (or sub bid) has a price p associated therewith, the value of the bid (or sub bid) is obtained by summing the prices of the satisfied sub bids and, if the bid (or sub bid) is satisfied, adding the price p to the summed values. For example, suppose that goods $g_1$ and $g_2$ are allocated to Bid 3. Since the sub bid represented by node B of Bid 3 has the logical operator OR connecting the sub bids represented by nodes D and E of Bid 3, the value of the sub bid represented by node B of Bid 3 is the sum of the prices $p_{3D}$, $p_{3E}$ and $p_{3B}$. However, suppose that only good $g_1$ is allocated to Bid 3. In this case, since only the sub bid associated with node D of Bid 3 is satisfied, the value of the sub bid associated with node B would only be the sum of the prices $p_{3D}$ and $p_{3B}$.

Lastly, if a bid (or sub bid) has two or more sub bids connected by the logical operator XOR and the bid (or sub bid) has a price p associated therewith, the value of the bid (or sub bid) is obtained by taking the maximum price of the satisfied sub bids and, if the bid (or sub bid) is satisfied, adding the price p thereto. For example, suppose that goods $g_3$ and $g_4$ are allocated to Bid 3. Since the sub bid represented by node C of Bid 3 has the logical operator AND connecting the sub bids represented by nodes F and G of Bid 3, the value of the sub bid represented by node C of Bid 3 is the sum of the prices $p_{3F}$, $p_{3G}$ and $p_{3C}$. Moreover, since the sub bid represented by node A of Bid 3 has the logical operator XOR connecting the sub bids represented by nodes B, C, H and I of Bid 3, and since only the sub bid associated with node C of Bid 3 is satisfied, the value of the sub bid represented by node A of Bid 3 is the sum of the prices $p_{3F}$, $p_{3G}$, $p_{3C}$ and $p_{3A}$. When a bid (or sub bid) has two or more satisfied sub bids connected by the logical operator XOR, the value of the bid (or sub bid) will be the price associated with the bid (or sub bid) added to the price of the sub bid having the maximum value. For example, if the sub bids associated with nodes B and C of Bid 4 are satisfied and the price $p_{4C}$ associated with node C is greater than the price associated with node B, the value of the sub bid associated with node A of Bid 4 will be the sum of the prices $p_{4C}$ and $p_{4A}$.

In FIG. 5, it can be determined that Bid 2 is not satisfied even though the sub bid associated with node H of Bid 2 is satisfied. This is because the logical operator AND associated with node A of Bid 2 requires that all of the sub bids associated with nodes B, C, H and I of Bid 2 must be satisfied in order for the sub bid associated with node A of Bid 2 to be satisfied. Hence, the value assigned to the sub bid associated with node A of Bid 2 is the price $p_{2H}$.

Once a value has been determined for the sub bid associated with node A of each of Bid 1-Bid 4, the value of the current allocation shown in FIG. 5 is determined by summing these values. In a similar manner, the value of the neighboring allocation shown in FIG. 6 is determined. More specifically, in FIG. 6, the value associated with node A of Bid 1 is the sum of the prices $p_{1D}$, $p_{1E}$, $p_{1B}$, $p_{1H}$ and $p_{1A}$. The value associated with node A of Bid 3 and node A of Bid 4 in FIG. 6 are the same as in the initial/current allocation shown in FIG. 5. Lastly, the value associated with node A of Bid 2 in FIG. 5 is $p_{2H}$ while the value associated with node A of Bid 2 in FIG. 6 is zero since no goods are allocated to Bid 2 in FIG. 6.

As can be seen, the value associated with node A of Bid 1 in FIG. 6 has increased over the value associated with node A of Bid 1 in FIG. 5, the values of Bid 3-Bid 4 in FIGS. 5 and 6 are the same and the value of Bid 2 in FIG. 6 has decreased from the value of Bid 2 in FIG. 5. Thus, in the foregoing example, simply reallocating good $g_5$ from Bid 2 to Bid 1 decreases and increases their respective values. Depending on the value associated with the reallocated good(s), the value of the neighboring allocation may increase, decrease or remain the same as the value of the current allocation.

To avoid creating an unsatisfied bid or sub bid, the move of one or more goods g from a source bid to a destination bid can be conditioned on the destination bid, or sub bid thereof, becoming satisfied by the move. For example, as shown in FIG. 7, suppose good $g_3$ is targeted for reallocation from Bid 3 to Bid 1. Because the movement of good $g_3$ by itself to Bid 1 will not result in the bid associated with node C of Bid 1 being satisfied, the system can choose not to reallocate good $g_3$ to Bid 1 unless good $g_4$ is also reallocated to Bid 1 whereupon the bid associated with node C of Bid 1 is satisfied. In the foregoing example, goods $g_3$ and $g_4$ were moved from Bid 3 to Bid 1. However, this is not to be construed as limiting the invention since preference can be given to reallocating one or more goods g in a manner that maintains satisfied bids (or sub bids) while changing unsatisfied bids (or sub bids) to satisfied bids (or sub bids). The foregoing preferential movement of goods, however, is not to be construed as limiting the invention since such preferential movement is optional.

Referring back to FIG. 3, if, in step 30, the value of the neighboring allocation is determined to be greater than the value of the best allocation, program flow advances to step 32 where the best allocation and its value are updated with the neighboring allocation and its value. Thereafter, program flow advances to step 34 where the current allocation and its value are updated with the neighboring allocation and its value.

If, however, in step 30 it is determined that the value of the neighboring allocation is not greater than the value of the best allocation, program flow advances directly to step 34, bypassing step 32.

Once step 34 is complete, steps 26-34 are repeated, including step 32 as necessary, for a predetermined interval of time or for a predetermined number of cycles.

The one or more goods reallocated to form the neighboring allocation in step 28 can be selected randomly or stochastically, or based on a heuristic value. For example, the one or more goods reallocated stochastically can be selected based upon an algorithm, such as a probability function, or a computer implementation of a random number generator, which randomly decides the one or more goods to be reallocated to construct the neighboring allocation in step 28. Alternatively, the decision to reallocate one or more goods to construct the neighboring allocation in step 28 can be based on a heuristic value for the source or destination bid (or sub bid). In one, non-limiting embodiment, the heuristic value for each bid (or sub bid) can be an indication of the capacity of the bid (or sub bid) to increase the value of the neighboring allocation. Any suitable method or algorithm which meets this general criteria can be used for determining a suitable heuristic value.

As can be seen, by reallocating one or more goods between two or more bids, a series of neighboring allocations can be constructed and their values determined to find a high quality, even optimal, allocation in a combinatorial auction where each bid of the auction utilizes highly expressive logical operators to express the buyer's requirement. However, as discussed above, there is no guarantee that the use of neighboring allocations in the foregoing manner will find the optimal allocation of goods. Accordingly, when determining allocations in the foregoing manner, there is a disposition to continue constructing neighboring allocations in an attempt to find the optimal allocation whereupon an artificial limit must be set in order to terminate processing in order to restrict such processing to a reasonable period of time. Examples of such an artificial limit include the number of neighboring allocations constructed and/or a period of time between commencement and termination of constructing neighboring allocations.

It would, therefore, be desirable to utilize conventional optimizing software, such as an integer program (IP) or mixed integer program (MIP) optimization software, such as the well known CPLEX optimizer available from ILOG, Inc., 1080 Linda Vista Avenue, Mountainview, Calif. 94043, to determine an optimal allocation of goods to bids without the need to construct neighboring allocations. Details regarding the CPLEX optimizer, and other like optimizing software are well-known in the art and will be described herein only insofar as it is necessary for an understanding of the present invention.

One aspect of utilizing optimizing software includes the requirement that inputs to the software must be properly formatted. To this end, one or more input variables, one or more constraints and one or more objectives representing the problem to be solved must be input into the optimizing software. Hereinafter, a method for converting bids that utilize highly expressive logical operators into variables and constraints suitable as input into the optimizing software will be described.

With reference to FIGS. 8 and 9, the formation of variables and constraints that express to the optimizing software the goals and logical operators for Bid 1 and Bid 3 of FIG. 4 will now be described. It is to be appreciated, however, that the variables and constraints for other bids, e.g., Bid 2 and Bid 4, are formed in a similar manner. Hence, the formation of variables and constraints for Bid 1 and Bid 3 is not to be construed as limiting the invention.

As shown in FIG. 8, a Boolean variable $x_{ij}$ is formed for each good j that occurs in Bid i, in this case Bid 1. Thus, in Bid 1, variables $x_{11}$-$x_{16}$ are formed for goods $g_1$-$g_6$, respectively. A Boolean variable $s_\beta$ is also formed for each sub bid β of Bid 1. Thus, in Bid 1, Boolean variables $s_{60}$-$s_{76}$ are formed for sub bids 60-76.

An integer or real variable $v_\beta$ is also formed for each sub Bid β of Bid 1. Thus, in Bid 1, variables $v_{60}$-$v_{76}$ are formed for sub bids 60-76. The variable v for each sub bid of Bid 1 denotes the value of the sub bid under optimal assignment. For example, the value of sub bid 60 is price $p_{1D}$ when good $g_1$ is assigned to Bid 1; the value of sub bid 62 is price $p_{1E}$ when good $g_2$ is assigned to Bid 1; and the value of sub bid 64 is the sum of prices $p_{1B}$, $p_{1D}$ and $p_{1E}$ when goods $g_1$ and $g_2$ are assigned to Bid 1.

Similarly, as shown in FIG. 9, for Bid 3, a variable $x_{ij}$ is formed for each good j that occurs in Bid i, in this case Bid 3; a variable $s_\beta$ is formed for each sub bid of Bid 3; and an integer or real variable $v_\beta$ is formed for each sub bid of Bid 3. In addition, a Boolean variable $t_\beta$ is formed for each pair of sub bids that are logically connected by the logical operator XOR. Thus, since sub bids 84, 90, 92 and 94 in FIG. 9 are all logically connected by a logical operator XOR, Boolean variables $t_{84}$, $t_{90}$, $t_{92}$ and $t_{94}$ are formed for sub bids 84, 90, 92 and 94, respectively.

With reference to FIG. 10 and with continuing reference to FIGS. 8 and 9, the formation of variables and constraints that express to the optimizing software the goals and logical operators for a Bid 5 having the form of a so-called "k-of" bid (or sub bid) will be now be described. K-of Bid 5 consists of k-of sub bid 106 having a "k-of" operator. K-of Bid 5 also includes child sub bids 100, 102 and 104, each in the form of an atomic sub bid, i.e., a sub bid having a good g and an associated price p, e.g., sub bid 100. However, the form of each child sub bid of Bid 5 is not to be construed as limiting the invention since each child sub bid can also be of the form that includes two or more sub bids logically connected by one or more logical operators, i.e., Boolean operator(s) or another "k-of" operator.

In general, a k-of bid (or sub bid) is a bid for k-of the listed sub bids. For example, if k=2, the allocation to Bid 5 of goods that satisfy any two child sub bids 100, 102 and 104 will satisfy the "k-of" requirement of Bid 5 (and sub bid 106).

The value of a satisfied k-of bid will be the sum of the values associated with all the satisfied child sub bids plus the value of the k-of sub bid. For example, if k=2 and goods $g_1$ and $g_2$ are allocated to Bid 5, the value of Bid 5 will be the sum of $p_{5A}$, $p_{5B}$, and $p_{5C}$. However, the value of an unsatisfied k-of bid will only be the sum of the satisfied sub bids. Thus, if k=2 and only good $g_1$ is allocated to Bid 5, the value of Bid 5 will be $p_{5B}$, i.e., the value associated with satisfied sub bid 100. If k=2 and goods $g_1$, $g_2$ and $g_3$ are allocated to Bid 5, the value of Bid 5 will be the sum of $p_{5A}$ plus the sum of (1) $p_{5B}$ and $p_{5C}$, (2) $p_{5B}$ and $p_{5D}$, or (3) $p_{5C}$ and $p_{5D}$ having the greatest value.

As shown in FIG. 10, a Boolean variable $x_{ij}$ is formed for each good j that occurs in Bid i, in this case Bid 5. Thus, in Bid 5, variables $x_{51}$-$x_{53}$ are formed for goods $g_1$-$g_3$, respectively. A Boolean variable $s_\beta$ is also formed for each sub bid β of Bid 5. Thus, in Bid 5, Boolean variables $s_{100}$-$s_{106}$ are formed for sub bids 100-106, respectively.

An integer or real value $v_\beta$ is also formed for each sub bid $\beta_i$ of Bid 5. Thus, in Bid 5, variables $v_{100}$-$v_{106}$ are formed for sub bids 100-106, respectively. The variable v for each sub bid of Bid 5 denotes the value of the sub bid under optimal assignment. Lastly, an integer value $n_\beta$ is formed that is related to the number of satisfied sub bids of Bid 5. For example, integer value $n_{106}$ is formed for sub bid 106 since, in Bid 5, the number of satisfied sub bids associated with sub bid 106 is the same as the number of satisfied sub bids associated with Bid 5 itself. However, this is not to be construed as limiting the invention.

For each bid to be processed utilizing the optimizing software, the Boolean variable $x_{ij}$, the Boolean variable $s_\beta$ and the integer or real variable $v_\beta$ is formed in the manner described above regardless of which logical operator(s), e.g., Boolean operator(s) or "k-of" operator(s), are included in the bid.

In operation, the optimizing software processes constraints (discussed hereinafter) subject to an objective whereupon each Boolean variable $x_{ij}$ is assigned a Boolean value of true (1) if good j is allocated by the optimizing software to Bid i; each Boolean variable $s_\beta$ is assigned a Boolean value of true (1) if the corresponding sub bid is satisfied by the allocation of goods made by the optimizing software; and each Boolean variable $t_\beta$ is assigned a Boolean value of true (1) if the corresponding sub bid contributes value to the encompassing XOR. As an example of the latter, suppose that only good $g_5$ is allocated to Bid 3 in FIG. 9. Under this circumstance, Boolean variable $t_{92}$ would be assigned a Boolean value of true by the optimizing software while the Boolean variables $t_{84}$, $t_{90}$ and $t_{94}$ would each be assigned a Boolean value of false.

The value the optimizing software assigns to each variable $v_\beta$ is the value of the corresponding sub bid resulting from the allocation of the corresponding good(s) to the bid including the sub bid.

Once the foregoing variables have been formed for each bid, constraints for each bid can then be formed. With reference to FIGS. 11(*a*)-11(*e*) and with continuing reference to FIGS. 8-10, for each atomic sub bid, i.e., a bid comprised of one good g and an associated price p, e.g., sub Bid 60 of Bid 1, the following Equations 1 and 2 are utilized to form the constraints therefor:

$$s \leq x \quad \text{EQUATION 1}$$

$$v \leq s*p \quad \text{EQUATION 2}$$

where s=a Boolean variable related to satisfaction of the sub bid;
   x=a Boolean variable related to whether the one good has been allocated to the bid including the sub bid;
   v=an integer or real variable related to the value of the sub bid; and
   p=a price associated with the sub bid.

Constraints formed for Bid 1 and Bid 3 utilizing Equations 1 and 2 above are shown in FIG. 11(*a*).

For each sub bid comprised of a logical operator AND logically connecting at least 2 child sub bids, the following Equations 3 and 4 are utilized to form the constraints therefor:

$$\text{EQUATION 3}: d*s \leq \sum_{i \leq d} s_i$$

$$\text{EQUATION 4}: v \leq (p*s) + \sum_{i \leq d} v_i$$

where s=a Boolean variable related to satisfaction of the sub bid;
   v=an integer or real variable related to the value of the sub bid;
   p=a price associated with the sub bid;
   d=the number of child sub bids logically connected by the logical operator AND;
   i=an integer value;
   $s_i$=a Boolean variable related to satisfaction of child sub bid i; and
   $v_i$=a variable related to the value of child sub bid i.

Constraints formed for Bid 1 and Bid 3 utilizing Equations 3 and 4 are shown in FIG. 11(*b*). For each constraint shown in FIG. 11(*b*), it can be noted that the value of one or more Boolean variables s and the value of one or more integer or real variables v on the right side of the inequality forming each constraint is determined from the constraints shown in FIG. 11(*a*). For example, the value for the Boolean variable $s_{60}$ in the first constraint associated with Bid 1 and Equation 3 in FIG. 11(*b*) is determined from the first constraint associated with Bid 1 and Equation 1 in FIG. 11(*a*).

For each sub bid comprised of a logical operator OR or a logical operator XOR logically connecting at least 2 child sub bids, the following Equations 5 and 6 are utilized to form the constraints therefor:

$$\text{EQUATION 5}: s \leq \sum_{i \leq d} s_i$$

$$\text{EQUATION 6}: v \leq (p*s) + \sum_{i \leq d} v_i$$

where s=a Boolean variable related to satisfaction of the sub bid;
   v=an integer or real variable related to the value of the sub bid;
   p=a price associated with the sub bid;
   d=the number of child sub bids logically connected by the logical operator OR or XOR;
   i=an integer value;
   $s_i$=a Boolean variable related to satisfaction of child sub bid i; and
   $v_i$=a variable related to the value of child sub bid i.

Constraints formed for Bid 1 and Bid 3 utilizing Equations 5 and 6 are shown in FIG. 11(*c*). The value of one or more Boolean variables s and the value of one or more integer or real variables v on the right side of the inequality forming each constraint shown in FIG. 11(*c*) is determined from the constraints shown in FIGS. 11(*a*) and 11(*b*). For example, the value of $v_{80}$ associated with Bid 3 and Equation 6 in FIG. 11(*c*) is determined from the topmost constraint associated with Bid 3 and Equation 2 in FIG. 11(*a*). The value of $s_{90}$ associated with Bid 3 and Equation 5 in FIG. 11(*c*) is determined from the constraint associated with Bid 3 and Equation 3 in FIG. 11(*b*).

In addition, for each sub bid comprised of a logical operator XOR logically connecting the at least 2 child sub bids, the following Equations 7 and 8 are utilized to form additional constraints therefor:

$$\text{EQUATION 7}: \sum_{i \leq d} t_i \leq 1$$

$$v_i \leq \text{maxval}*t_i, \text{ for every } i \leq d \quad \text{EQUATION 8}$$

where d=the number of child sub bids logically connected by the logical operator XOR;
   i=an integer value;
   $s_i$=a Boolean variable related to satisfaction of child sub bid i;

$v_i$=an integer or real variable related to the value of child sub bid i;

$t_i$=a Boolean variable utilized to ensure that the value of only one of the XOR'ed child sub bids contributes to the value of v for the sub bid; and maxval=a variable having a value greater than any value $v_i$.

Constraints formed for Bid 3 utilizing Equations 7 and 8 are shown in FIG. 11(*d*).

Lastly, for each k-of bid (or sub bid), the following Equations 9-11 are utilized to form the constraints therefor:

$$\text{EQUATION 9}: n \le \sum_{i \le d} s_i,$$

$$s*k \le n \qquad \text{EQUATION 10}$$

$$\text{EQUATION 11}: v \le (p*s) + \sum_{i \le d} v_i$$

where n=an integer or real value related to the number of satisfied child sub bids;

$s_i$=a Boolean variable related to satisfaction of child sub bid i;

s=a Boolean variable related to satisfaction of the corresponding bid (or sub bid);

k=the number of sub bids which, when satisfied, will satisfy the bidder's requirement;

v=an integer or real variable related to the value of the bid (or sub bid);

p=a price associated with a "top level" sub bid of the bid (or sub bid);

d=an integer value related to the number of child sub bids of the bid (or sub bid);

i=an integer value related to a particular child sub bid; and $v_i$=a variable related to the value of child sub bid i.

Constraints formed for Bid 5 utilizing Equations 9-11 are shown in FIG. 11(*e*).

If Bids 1, 3 and 5 represent the only bids received in a combinatorial auction for goods $g_1$-$g_6$, the constraints shown in FIGS. 11(*a*)-11(*e*) are the only constraints necessary for the optimizing software to determine an optimal allocation of goods $g_1$-$g_6$. The only thing remaining is to establish an objective for the optimizing software. This objective can include maximizing (forward auction) or minimizing (reverse auction) the value of all the received bids, in this case Bids 1, 3 and 5. However, this is not to be construed as limiting the invention since other objectives, such as maximizing or minimizing the number of goods exchanged, can also be utilized.

Once the variables and constraints for each received bid have been formed in the above-described manner and the objective for the received bids has been defined, the optimizing software processes the bids subject to the constraints to achieve the objective.

In operation, the values assigned to each Boolean variable s, $s_i$, t and $t_i$ by the optimizing software during determination of the optimal allocation of goods are not of any direct relevance. In contrast, the relevant parts of the solution are the value assigned to each Boolean variable x and the value assigned to each variable v or $v_i$ associated with a "top level" sub bid of a bid, e.g., $v_{76}$, $v_{96}$ and $v_{106}$ for Bids 1, 3 and 5, respectively. To this end, the optimizing software assigning the Boolean value of true (1) to a Boolean variable x indicates that the good associated with this Boolean variable has been assigned to the bid associated therewith. For example, if the optimizing software assigns the Boolean value true to Boolean variable $x_{11}$, this assignment indicate that good $g_1$ has been allocated to Bid 1. Since, in this example, good $g_1$ is allocated to Bid 1, this same good cannot be allocated to Bid 3 or Bid 5. Hence, the optimizing software will assign the Boolean value false to Boolean variables $x_{31}$ and $x_{51}$.

The value assigned to each variable v or $v_i$ associated with a "top level" sub bid of a bid, e.g., $v_{76}$, $v_{96}$ and $v_{106}$ for Bids 1, 3 and 5, respectively, represent the values of the corresponding bid (or sub bid) resulting from the goods allocated thereto by the optimizing software. For example, if good $g_5$ is the only good allocated to Bid 1, the value of $v_{76}$ will be the sum of $p_{1H}$ and $p_{1A}$.

With reference back to FIG. 2, desirably, each bid is received by computer system 2 having microprocessor 4 and computer-useable storage medium 12. The computer-useable storage medium 12 has stored thereon computer-readable program code comprising the optimizing software which, when executed, causes microprocessor 4 to receive each bid and to form therefrom the variables and constraints discussed above in connection with FIGS. 8-12(*b*). Once the variables and constraints for each received bid has been formed, microprocessor 4 processes the received bids with the optimizing software to achieve a predetermined objective subject to the constraints thereby determining the optimal allocation of goods.

As can be seen, the ability to form variables and constraints for one or more bids, each of which utilizes one or more logical operators to express the buyer's requirement, enables conventional optimizing software to be utilized to determine an optimal allocation of goods. This avoids the need to form a series of neighboring allocations in an attempt to find such optimal allocation.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention is claimed to be:

1. A method for enabling optimizing software to determine an optimal allocation in a combinatorial auction, the method comprising computer implemented steps of:
   (a) receiving a plurality of bids each of which includes a plurality of sub bids, wherein each sub bid is comprised of one of one good and an associated price and a logical operator logically connecting at least two child sub bids and a price associated with the logical operator;
   (b) defining an objective for the plurality of bids;
   (c) defining for each bid a plurality of mathematical relationships without logical operators, wherein said mathematical relationships collectively represent the bid; and
   (d) causing the optimizing software to process the received bids to achieve the objective subject to the mathematical relationships, wherein step (c) includes, for each sub bid comprised of one good and an associated price, defining: a first mathematical relationship between a pair of Boolean variables that relate the one good being allocated to the bid that includes the sub bid to satisfaction of the sub bid, wherein the sub bid is satisfied when the one good is allocated thereto; and a second mathematical relationship that relates a value of the sub bid to a product of the price of the sub bid times a value of a Boolean variable related to the satisfaction of the sub bid.

2. The method of claim 1, wherein: the first mathematical relationship includes setting the Boolean variable related to satisfaction of the sub bid less than or equal to ($\leq$) the Boolean variable related to the bid including the sub bid being allocated the one good; and the second mathematical relationship includes setting the value of the sub bid $\leq$ the product of the price of the sub bid times the value of a Boolean variable related to the satisfaction of the sub bid.

3. The method of claim 1, wherein step (c) includes, for each sub bid comprised of a logical operator AND logically connecting at least two child sub bids, defining: a third mathematical relationship that relates a sum of Boolean values related to satisfaction of each child sub bid to a product of the total number of the child sub bids logically connected by the logical operator AND times a Boolean value related to the satisfaction of the sub bid comprised of the logical operator AND, wherein the sub bid comprised of the logical operator AND is satisfied when all of the child sub bids logically connected thereby are satisfied; and a fourth mathematical relationship that relates a value of the sub bid comprised of the logical operator AND to a sum of the values of each child sub bid that is satisfied and the price associated with the sub bid comprised of the logical operator AND, wherein said price is included in the sum when said sub bid is satisfied, otherwise it is not included in the sum.

4. The method of claim 3, wherein: the third mathematical relationship includes setting the product of the total number of the child sub bids logically connected by the logical operator AND times a Boolean value related to the satisfaction of the sub bid comprised of the logical operator AND $\leq$ the sum of the Boolean values related to satisfaction of each of the at least two child sub bids; and the fourth mathematical relationship includes setting the value of the sub bid comprised of the logical operator AND $\leq$ the sum of (i) the values of the at least two child sub bids and (ii) the price associated with the sub bid comprised of the logical operator AND times the Boolean value related to satisfaction of said sub bid.

5. The method of claim 1, wherein step (c) includes, for each sub bid comprised of a logical operator OR or XOR logically connecting at least two child sub bids, defining: a fifth mathematical relationship that relates a sum of Boolean values related to satisfaction of each child sub bid to satisfaction of the sub bid comprised of the logical operator OR or XOR, wherein the sub bid comprised of the logical operator OR or XOR is satisfied when at least one of the child sub bids logically connected thereby is satisfied, and a sixth mathematical relationship that relates a value of the sub bid comprised of the logical operator OR or XOR to a sum of the values of each child sub bid that is satisfied and the price associated with the sub bid comprised of the logical operator OR or XOR, wherein said price is included in the sum when said sub bid is satisfied, otherwise it is not included in the sum.

6. The method of claim 5, wherein: the fifth mathematical relationship includes setting the satisfaction of the sub bid comprised of the logical operator OR or XOR $\leq$ the sum of Boolean values related to satisfaction of each of the at least two child sub bids; and the sixth mathematical relationship includes setting the value of the sub bid comprised of the logical operator OR or XOR $\leq$ the sum of the values of the at least two child sub bids and the price associated with the sub bid comprised of the logical operator OR or XOR times the Boolean value related to satisfaction of said sub bid.

7. The method of claim 1, wherein step (c) includes, for each sub bid comprised of a logical operator XOR logically connecting the at least two child sub bids, defining a seventh mathematical relationship that relates an integer value to a sum of Boolean values related to each child sub bid, wherein each child sub bid that contributes value to the sub bid comprised of the logical operator XOR is assigned a first Boolean value, otherwise it is assigned a second Boolean value.

8. The method of claim 7, wherein the seventh mathematical relationship includes setting the sum of the Boolean values related to the at least two child sub bids $\leq$ the integer value.

9. The method of claim 1, wherein step (c) includes defining an eighth mathematical relationship for each child sub bid that contributes value to the sub bid comprised of the logical operator XOR, wherein said relationship relates a value of the child sub bid to a product of the Boolean value of said child sub bid times a predetermined value.

10. The method of claim 9, wherein the eighth mathematical relationship includes setting the value of the child sub bid to the product of the Boolean value of said sub bid times the predetermined value.

11. The method of claim 9, wherein the predetermined value is greater than or equal to the largest value of any of the child sub bids that contributes value to the sub bid comprised of the logical operator XOR.

12. The method of claim 11, wherein the predetermined value is the sum of all the prices included in the bid including the child sub bids.

13. The method of claim 1, wherein step (c) includes, for each sub bid for k number of child sub bids, where k is less than a total number of child sub bids available, defining: a ninth mathematical relationship that relates a total number of satisfied child sub bids bid to a sum of Boolean values related to satisfaction of each child sub bid; a tenth mathematical relationship that relates a total number of satisfied child sub bids to a product of k times a Boolean value related to satisfaction of the sub bid; and an eleventh mathematical relationship that relates a value of the sub bid to a sum of the values of each child sub bid that is satisfied and a price associated with the sub bid, wherein said price is included in the sum when said sub bid is satisfied, otherwise it is not included in the sum.

14. The method of claim 13, wherein the ninth mathematical relationship includes setting the total number of satisfied child sub bid$\leq$ the sum of Boolean values related to satisfaction of each child sub bid; the tenth mathematical relationship includes setting the product of k times the Boolean value related to satisfaction of the sub bid $\leq$ the total number of satisfied child sub bids; and the eleventh mathematical relationship includes setting the value of the sub bid $\leq$ the sum of the values of each child sub bid that is satisfied and the price associated with the sub bid times a Boolean value related to satisfaction of the sub bid.

15. The method of claim 1, wherein step (c) includes: for each sub bid comprised of one good and an associated price, defining: a first mathematical relationship between a pair of Boolean variables that relate the one good being allocated to the bid that includes the sub bid to satisfaction of the sub bid, wherein the sub bid is satisfied when the one good is allocated thereto, and a second mathematical relationship that relates a value of the sub bid to a product of the price of the sub bid times a value of a Boolean variable related to the satisfaction of the sub bid; for each sub bid comprised of a logical operator AND logically connecting at least two child sub bids, defining: a third mathematical relationship that relates a sum of Boolean values related to satisfaction of each child sub bid to a product of the total number of the child sub bids logically connected by the logical operator AND times a Boolean value related to the satisfaction of the sub bid comprised of the logical operator AND, wherein the sub bid comprised of the logical operator AND is satisfied when all of the child sub bids logically connected thereby are satisfied, and a fourth mathematical relationship that relates a value of the sub bid comprised of the logical operator AND to a sum of the values of each child sub bid that is satisfied and the price associated with the sub bid comprised of the logical operator AND, wherein said price is included in the sum when said sub bid is satisfied, otherwise it is not included in the sum; for each sub bid comprised of a logical operator OR or XOR logically connecting at least two child sub bids, defining: a fifth mathematical relationship that relates a sum of Boolean values related to satisfaction of each child sub bid to satisfaction of the sub bid comprised of the logical operator OR or XOR, wherein the sub bid comprised of the logical operator OR or XOR is satisfied when at least one of the child sub bids logically connected thereby is satisfied, and a sixth mathematical relationship that relates a value of the sub bid comprised of the logical operator OR or XOR to a sum of the values of each child sub bid that is satisfied and the price associated with the sub bid comprised of the logical operator OR or XOR, wherein said price is included in the sum when said sub bid is satisfied, otherwise it is not included in the sum; for each sub bid comprised of a logical operator XOR logically connecting the at least two child sub bids, defining: a seventh mathematical relationship that relates an integer value to a sum of Boolean values related to each child sub bid, wherein each child sub bid that contributes value to the sub bid comprised of the logical operator XOR is assigned a first Boolean value, otherwise it is assigned a second Boolean value, and an eighth mathematical relationship for each child sub bid that contributes value to the sub bid comprised of the logical operator XOR, wherein said relationship relates a value of the child sub bid to a product of the Boolean value of said child sub bid times a predetermined value; and for each sub bid for k number of child sub bids, where k is less than a total number of child sub bids available, defining: a ninth mathematical relationship that relates a total number of satisfied child sub bids to a sum of Boolean values related to satisfaction of each child sub bid; a tenth mathematical relationship that relates a total number of satisfied child sub bids to a product of k times a Boolean value related to satisfaction of the sub bid; and an eleventh mathematical relationship that relates a value of the sub bid to a sum of the values of each child sub bid that is satisfied and a price associated with the sub bid, wherein said price is included in the sum when said sub bid is satisfied, otherwise it is not included in the sum.

16. The method of claim 1, wherein:
for each sub bid comprised of one good and an associated price, said dub bid is satisfied when the one good is allocated to the bid including the sub bid;
for each sub bid comprised of a logical operator AND logically connecting at least two child sub bids, said sub bid is satisfied when all of the child sub bids are satisfied;
for each sub bid comprised of a logical operator OR or XOR logically connecting at least two child sub bids, said sub bid is satisfied when at least one of the child sub bids is satisfied; and
for each sub bid for k number of child sub bids, said sub bid is satisfied when k number of child sub bids are satisfied.

17. A computer-readable medium having stored thereon instruction which, when executed by a processor, cause the processor to perform the steps of:
(a) receive a plurality of bids each of which includes a plurality of sub bids, wherein each sub bid is comprised of one of one good and an associated price and a logical operator logically connecting at least two child sub bids and a price associated with the logical operator;
(b) define an objective for the plurality of bids;
(c) define for each bid a plurality of mathematical relationships without logical operators, wherein said mathematical relationships collectively represent the bid; and
(d) process the received bids subject to the mathematical relationships to achieve the objective, wherein step (c) includes:
for each sub bid comprised of one good and an associated price, define:
a first mathematical relationship between a pair of Boolean variables that relate the one good being allocated to the bid that includes the sub bid to satisfaction of the sub bid, wherein the sub bid is satisfied when the one good is allocated thereto, and
a second mathematical relationship that relates a value of the sub bid to a product of the price of the sub bid times a value of a Boolean variable related to the satisfaction of the sub bid.

18. The computer-readable medium of claim 17, wherein step (c) includes:
for each sub bid comprised of a logical operator AND logically connecting at least two child sub bids, define:
a third mathematical relationship that relates (1) a sum of Boolean values related to satisfaction of each child sub bid to a product of the total number of the child sub bids logically connected by the logical operator AND times a Boolean value related to the satisfaction of the sub bid comprised of the logical operator AND, wherein the sub bid comprised of the logical operator AND is satisfied when all of the child sub bids logically connected thereby are satisfied, and
a fourth mathematical relationship that relates a value of the sub bid comprised of the logical operator AND to a sum of the values of each child sub bid that is satisfied and the price associated with the sub bid comprised of the logical operator AND, wherein said price is included in the sum when said sub bid is satisfied, otherwise it is not included in the sum; for each sub bid comprised of a logical operator OR or XOR logically connecting at least two child sub bids, define:
a fifth mathematical relationship that relates a sum of Boolean values related to satisfaction of each child sub bid to satisfaction of the sub bid comprised of the logical operator OR or XOR, wherein the sub bid comprised of the logical operator OR or XOR is satisfied when at least one of the child sub bids logically connected thereby is satisfied, and
a sixth mathematical relationship that relates a value of the sub bid comprised of the logical operator OR or XOR to a sum of the values of each child sub bid that is satisfied and the price associated with the sub bid comprised of the logical operator OR or XOR, wherein said price is included in the sum when said sub bid is satisfied, otherwise it is not included in the sum;
for each sub bid comprised of a logical operator XOR logically connecting the at least two child sub bids, define:
a seventh mathematical relationship that relates an integer value to a sum of Boolean values related to each child sub bid, wherein each child sub bid that contributes value to the sub bid comprised of the logical operator XOR is assigned a first Boolean value, otherwise it is assigned a second Boolean value, and an eighth mathematical relationship for each child sub bid that contributes value to the sub bid comprised of the logical operator XOR, wherein said relationship relates a value of the child sub bid to a product of the Boolean value of said child sub bid times a predetermined value; and for each sub bid for k number of child sub bids, where k is less than a total number of child sub bids available, define:

a ninth mathematical relationship that relates a total number of satisfied child sub bids to a sum of Boolean values related to satisfaction of each child sub bid;

a tenth mathematical relationship that relates a total number of satisfied child sub bids to a product of k times a Boolean value related to satisfaction of the sub bid; and an eleventh mathematical relationship that relates a value of the sub bid to a sum of the values of each child sub bid that is satisfied and a price associated with the sub bid, wherein said price is included in the sum when said sub bid is satisfied, otherwise it is not included in the sum.

\* \* \* \* \*

UNITED STATES PATENT AND TRADEMARK OFFICE
CERTIFICATE OF CORRECTION

PATENT NO.        : 7,487,124 B2                                          Page 1 of 1
APPLICATION NO. : 10/618238
DATED             : February 3, 2009
INVENTOR(S)       : Boutilier It is certified that error appears in the above-identified patent and that said Letters Patent is hereby corrected as shown below:

Column 18, Line 44, Claim 14, "bid ≤the" should read -- bids ≤the --

Column 19, Line 51, Claim 16, "said dub bid" should read -- said sub bid --

Column 20, Line 25, Claim 18, "relates (1) a sum" should read -- relates a sum --

Signed and Sealed this

Ninth Day of June, 2009

JOHN DOLL
*Acting Director of the United States Patent and Trademark Office*